(12) United States Patent
Sugiyama et al.

(10) Patent No.: US 8,632,039 B2
(45) Date of Patent: Jan. 21, 2014

(54) DEVICE FOR MOUNTING WIRELESS DEVICE CASE

(75) Inventors: Masaki Sugiyama, Kyoto (JP); Nobuyuki Mase, Nara (JP); Takayuki Matsumoto, Osaka (JP); Jyunichi Saito, Kyoto (JP)

(73) Assignee: Panasonic Corporation, Osaka (JP)

( * ) Notice: Subject to any disclaimer, the term of this patent is extended or adjusted under 35 U.S.C. 154(b) by 235 days.

(21) Appl. No.: 13/140,692

(22) PCT Filed: Feb. 26, 2010

(86) PCT No.: PCT/JP2010/001306
§ 371 (c)(1),
(2), (4) Date: Jun. 17, 2011

(87) PCT Pub. No.: WO2010/098122
PCT Pub. Date: Sep. 2, 2010

(65) Prior Publication Data
US 2011/0248133 A1    Oct. 13, 2011

(30) Foreign Application Priority Data
Feb. 27, 2009    (JP) .................................. 2009-045148

(51) Int. Cl.
*A47K 1/08*    (2006.01)
(52) U.S. Cl.
USPC ......................................... 248/313; 210/249
(58) Field of Classification Search
USPC .............. 248/154, 310, 313–315, 316.6, 534, 248/541, 674, 675; 210/249, 441; 285/30
See application file for complete search history.

(56) References Cited

U.S. PATENT DOCUMENTS

| | | | | |
|---|---|---|---|---|
| 1,806,560 A | * | 5/1931 | McKinley | 248/313 |
| 2,277,737 A | * | 3/1942 | Wilkinson | 210/249 |
| 2,277,738 A | * | 3/1942 | Wilkinson | 210/249 |
| 2,341,888 A | * | 2/1944 | White | 210/441 |
| 3,746,371 A | * | 7/1973 | Leopold et al. | 285/30 |
| 2005/0066746 A1 | | 3/2005 | Winter | |

FOREIGN PATENT DOCUMENTS

| | | |
|---|---|---|
| AU | 2009265988 A | 5/2009 |
| CN | 101079182 A | 11/2007 |
| EP | 0580520 A1 | 1/1994 |
| EP | 2079991 A2 | 7/2009 |
| EP | 2 141 465 A1 | 1/2010 |
| FR | 2 907 545 A1 | 4/2008 |
| FR | 2907545 A1 | 4/2008 |
| JP | 10-063976 A | 3/1998 |
| JP | 2582843 Y2 | 10/1998 |

(Continued)

OTHER PUBLICATIONS

Extended European Search Report for European Application No. 10746005.7, dated Sep. 13, 2011.
International Search Report for International Application No. PCT/JP2010/001306, dated Mar. 23, 2010, 1 page.

(Continued)

*Primary Examiner* — Gwendolyn Baxter
(74) *Attorney, Agent, or Firm* — Brinks Gilson & Lione

(57) ABSTRACT

First mounting ring and second mounting ring are fixed to wireless device case using fastening screws. First mounting ring and second mounting ring are fitted to measurement display section from above, and co-mounting bolt is passed through rings to fasten the rings together. This configuration allows a wireless device to be disposed independent of a meter, and the wireless device can be easily mounted to the meter.

3 Claims, 14 Drawing Sheets

(56) References Cited

FOREIGN PATENT DOCUMENTS

| JP | 11-086174 A | 3/1999 |
| JP | 11-219491 A | 8/1999 |
| WO | WO 2004/111968 | 12/2004 |
| WO | WO 2008/049987 A2 | 5/2008 |
| WO | WO 2010/000539 A1 | 1/2010 |

OTHER PUBLICATIONS

Communication from the European Patent Office for European Application No. 10746005.7, dated Jul. 24, 2012, 6 pages.

Communication in European Patent Application No. 10 746 005.7, dated Jul. 15, 2013, 5 pages.

* cited by examiner

DEVICE FOR MOUNTING WIRELESS DEVICE CASE

This application is a 371 application of PCT/JP2010/001306 having an international filing date of Feb. 26, 2010, which claims priority to JP2009-045148 filed on Feb. 27, 2009, the entire contents of which are incorporated herein by reference.

TECHNICAL FIELD

The present invention relates to devices for mounting wireless device case that is used for mounting a wireless device case with built-in wireless device, which transmits meter readings, to a meter.

BACKGROUND ART

Some water meters and gas meters are equipped with a wireless device for transmitting meter readings by wireless. A meter disclosed in Patent Literature 1 includes a wireless device inside a meter casing. A meter reading measured by the meter is sent outside by the wireless device. Accordingly, meter readings can be collected at a place far from the meter by using wireless transmission. In addition, meter readings from multiple meters can be collected at one place.

However, this conventional meter includes the wireless device inside the meter casing. The meter is often installed in a highly-humid environment. This often causes dew condensation by difference between temperature of water or gas passing through the meter and ambient temperature. In other words, the wireless device in the conventional meter has disadvantages such as erroneous operation of electronic circuit, degradation of wireless performance, and degradation of insulation performance due to influence of moisture such as dew condensation water.

[PTL 1] Japanese Patent Unexamined Publication No. H11-86174

SUMMARY OF THE INVENTION

The present invention solves the above disadvantages, and offers a device for mounting wireless device case that allows easy mounting of a wireless device case with built-in wireless device to a meter without being affected by moisture such as dew condensation water.

The device for mounting wireless device case of the present invention includes a first mounting ring and a second mounting ring fitted from above to a meter casing. Each of the first mounting ring and the second mounting ring in the device for mounting wireless device case of the present invention includes a fastening screw hole. Each of the first mounting ring and the second mounting ring also has a mounting bolt hole. The device for mounting wireless device case of the present invention is fixed to the wireless device case by the fastening screws and the fastening screw holes of the first mounting ring and the second mounting ring. The device for mounting wireless device case of the present invention then fixes the wireless device case onto a meter by passing a co-mounting bolt through the mounting bolt holes of the first mounting ring and the second mounting ring, and tightening the first mounting ring and the second mounting ring together.

This configuration facilitates mounting of the wireless device case to the meter. Accordingly, the wireless device can be disposed independent of the meter to prevent erroneous operation or performance degradation of the wireless device due to an influence of moisture, typically dew condensation of the meter.

DETAILED DESCRIPTION OF THE PREFERRED EMBODIMENTS (First Exemplary Embodiment)

Figure 1:
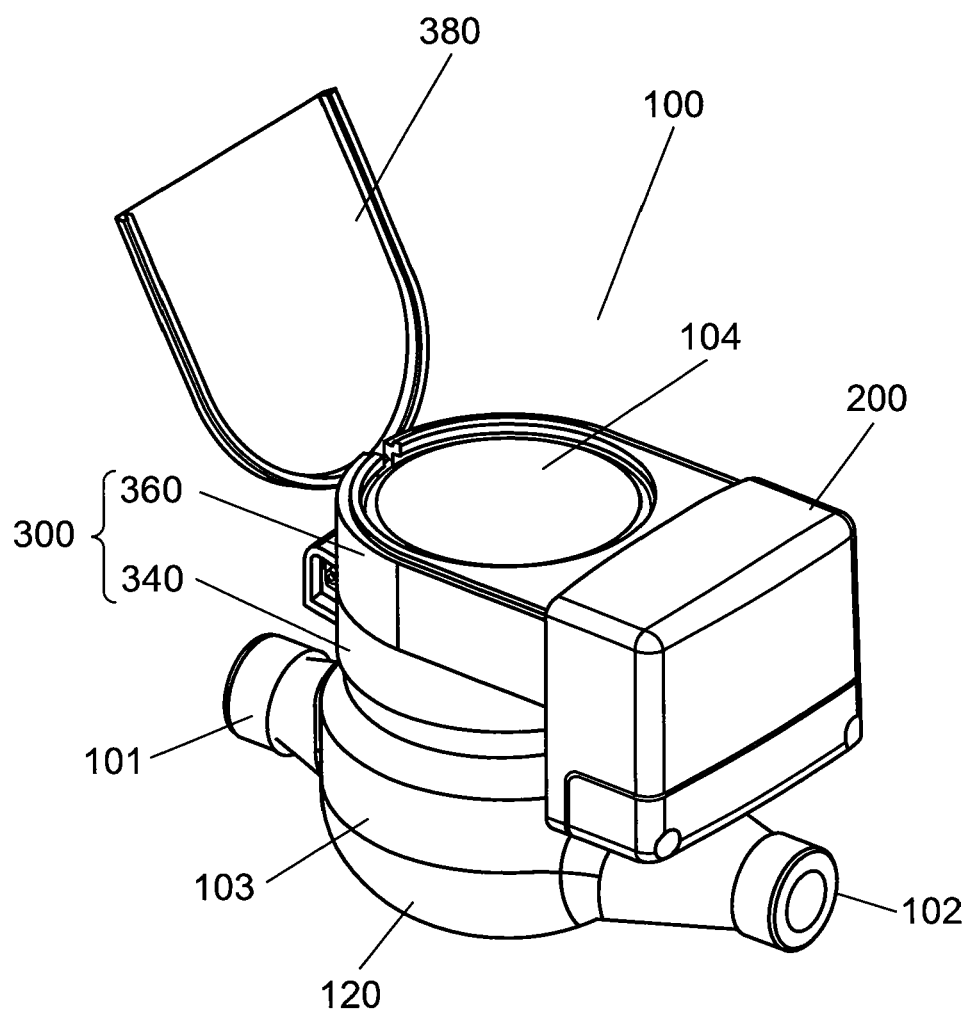
FIG. 1 is a perspective view of a water meter using a device for mounting wireless device case in accordance with a first exemplary embodiment of the present invention.
Figure 2:
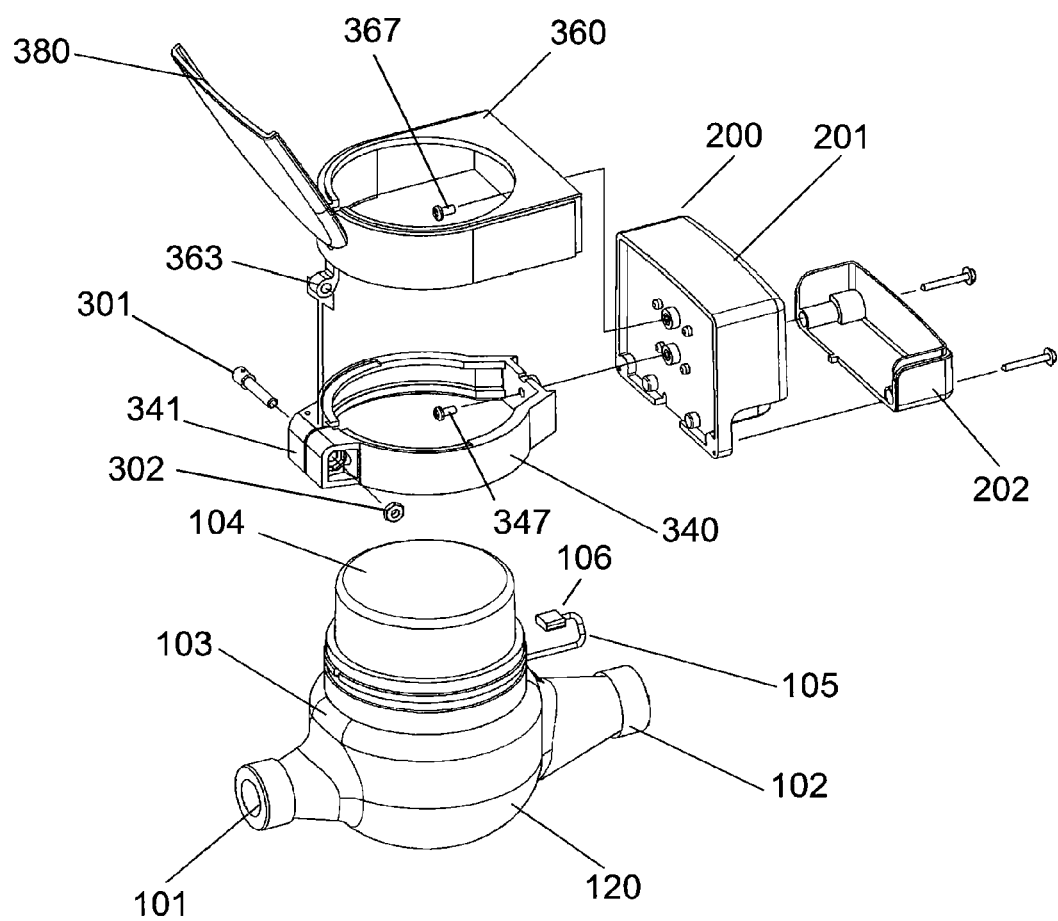
FIG. 2 is an exploded perspective view of the water meter using a device for mounting wireless device case in accordance with the first exemplary embodiment.

FIG. 1 is a perspective view of a water meter in which a wireless device case is mounted to its main body by using a device for mounting wireless device case in the first exemplary embodiment of the present invention. FIG. 2 is an exploded perspective view of the water meter illustrating a configuration of mounting the wireless device case to the main body of water meter by using the device for mounting wireless device case in the first exemplary embodiment of the present invention. This exemplary embodiment refers to the water meter as an example of meters, but the present invention is not limited to the water meter. The present invention is applicable to other measurement meters such as gas meters and electric power meters.

Water meter 100 includes water-meter body 120, wireless device case 200, and device for mounting wireless device case 300. Wireless device case 200 is mounted to water-meter body 120 by using device for mounting wireless device case 300.

Water-meter body 120 includes water inlet 101, water outlet 102, measurement section 103, and measurement display section 104. Water entering from water inlet 101 passes through measurement section 103, and exits from water outlet 102. Measurement section 103 measures volume of water passing through. Measured volume of water is displayed on measurement display section 104. This displayed measurement value is called a meter reading.

Wireless device case 200 has a built-in wireless device, which is described later. The wireless device transmits outside a meter reading measured by measurement section 103 via radio waves.

Device for mounting wireless device case 300 includes first mounting ring 340 and second mounting ring 360. Wireless device case 200 is fixed onto first mounting ring 340 and second mounting ring 360 by fastening screws 347 and 367, respectively. First mounting ring 340 and second mounting ring 360 are fitted from above to measurement display section 104 that is a cylindrical section of water meter 100. As described later, first mounting ring 340 and second mounting ring 360 are fitted from above, and tightened and attached to measurement display section 104 that is the cylindrical section by one mounting bolt 301.

In this way, wireless device case 200 can be easily and indirectly mounted to water-meter body 120 by using device for mounting wireless device case 300. Display cover 380 is attached to second mounting ring 360 of device for mounting wireless device case 300 in an openable manner on the top face of measurement display section 104.

Wireless device case 200 is integrally designed as the water meter, together with first mounting ring 340, second mounting ring 360, and display cover 380 of device for mounting wireless device case 300. On the other hand, wireless device case 200 has a shape and configuration taking into account an event of using it independently as a wireless repeater. The wireless device inside wireless device case 200 and measurement section 103 of water meter 100 are electrically coupled via connector 106 at a tip of data transmission line 105. With this configuration, the wireless device transmits by wireless a meter reading measured by measurement section 103 to a data collecting terminal, which is described later.

Figure 3:
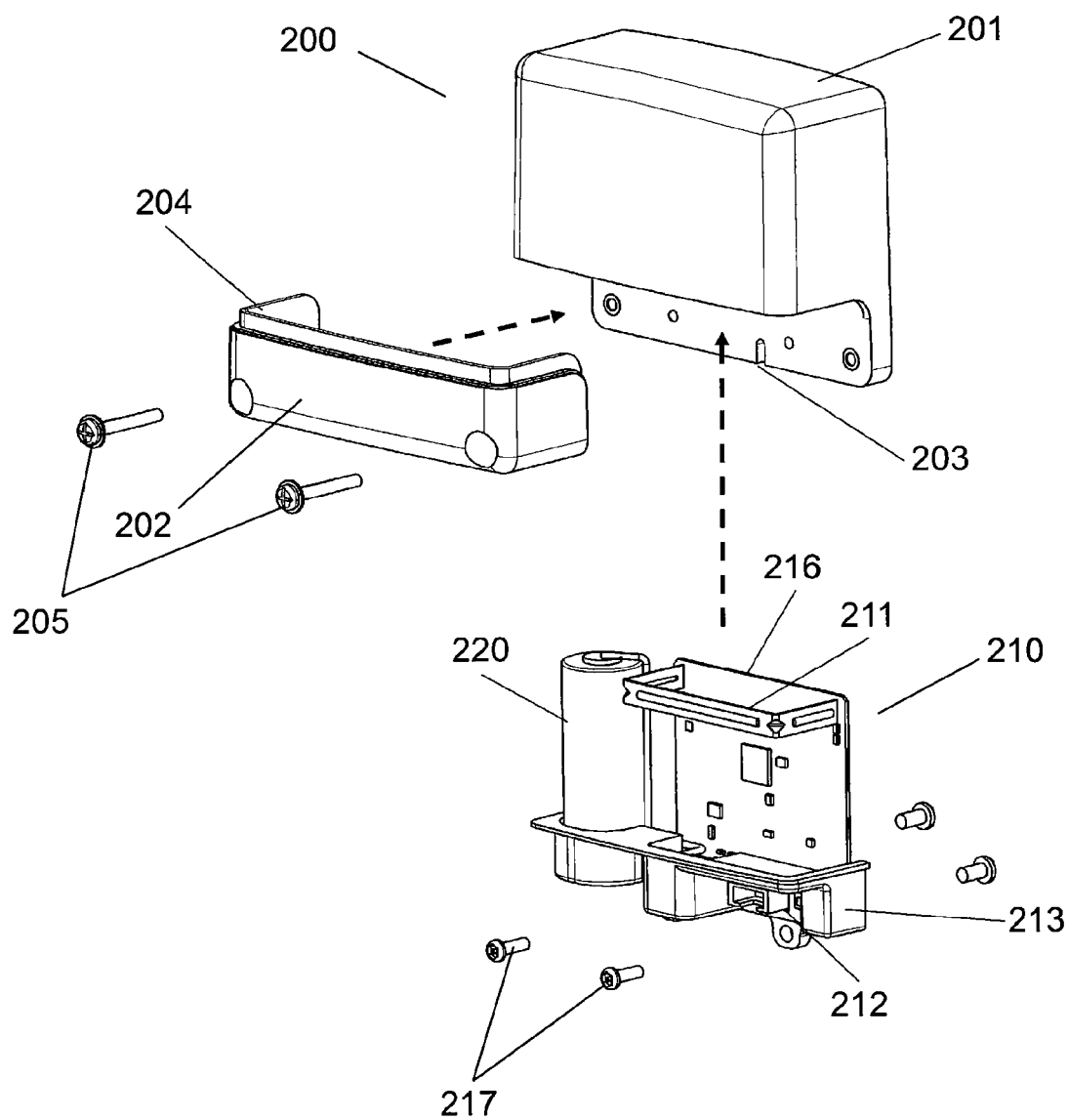
FIG. 3 is an exploded perspective view of a wireless device case in accordance with the first exemplary embodiment.

FIG. 3 is an exploded perspective view illustrating a configuration inside wireless device case 200. Wireless device case 200 includes upper case 201 and lower case 202, and houses wireless device 210 inside. Upper case 201 and lower case 202 are made of a material that passes through radio waves, such as resin. Wireless device 210 includes electronic substrate 216, antenna 211 for transmitting and receiving radio waves, battery 220, and connector receiver 212 for connecting connector 106 (FIG. 2) of data transmission line 105 (FIG. 2). Using these components, wireless device 210 transmits and receives meter readings via radio waves.

Wireless device 210 is inserted into upper case 201, and fixed onto upper case 201 by board support 213 and screw 217. Then, upper case 201 and lower case 202 are fixed by case screw 205. Since upper case 201 and lower case 202 are fixed by case screw 205, lower case 202 can be opened and closed as required. Waterproof flange 204 is provided on lower case 202. Waterproof flange 204 is provided on a face between upper case 201 and lower case 202. This prevents water from entering inside wireless device case 200.

Figure 4:
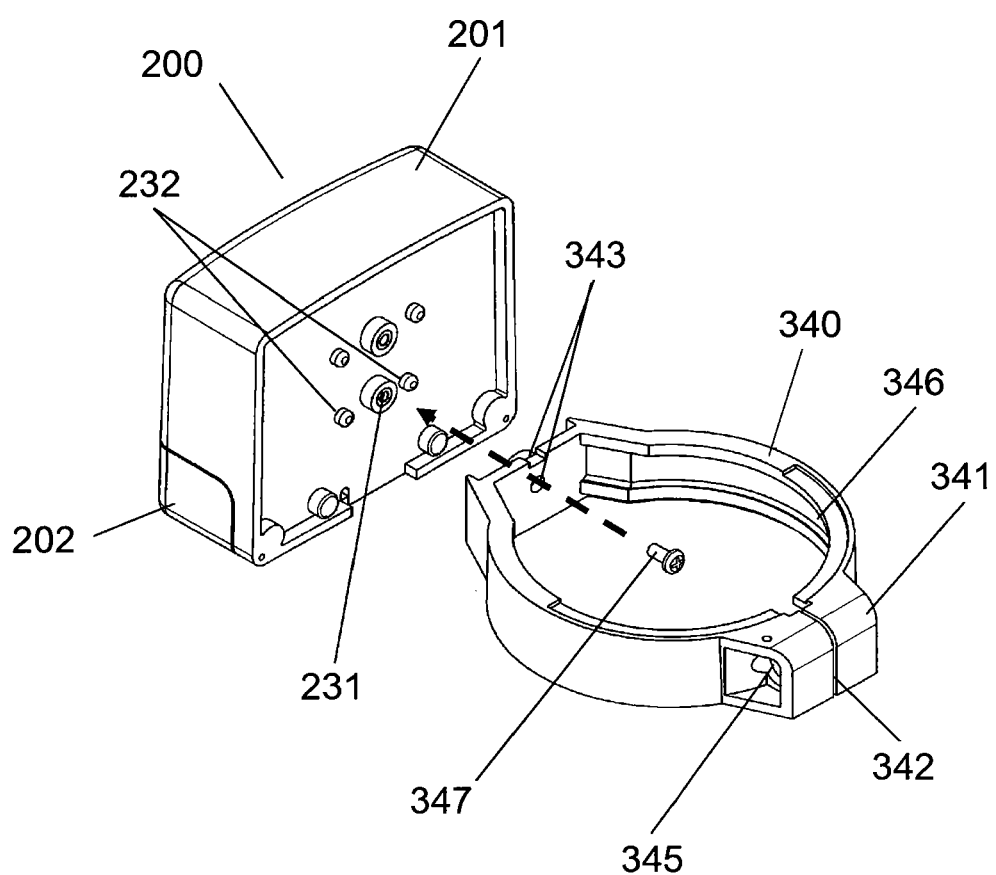
FIG. 4 is a perspective view of the wireless device case and a first mounting ring in accordance with the first exemplary embodiment.
Figure 5:
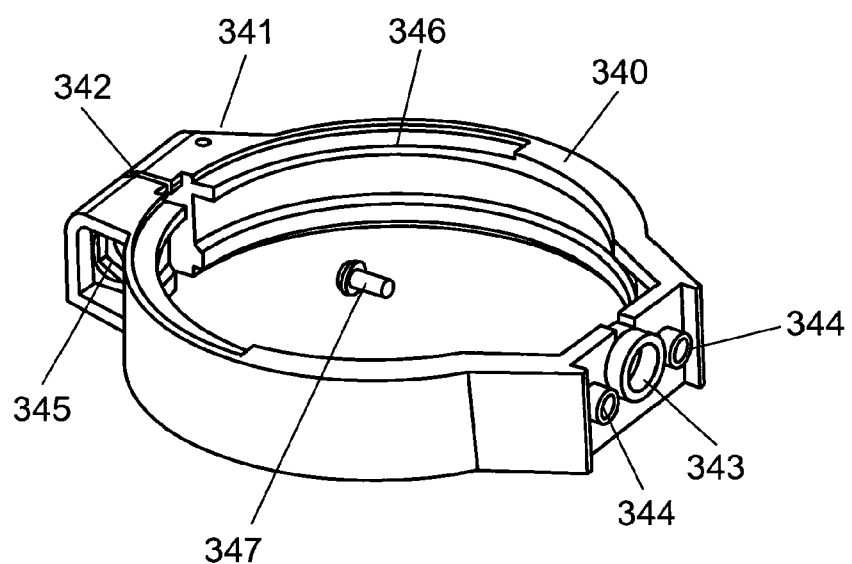
FIG. 5 is a perspective view of the first mounting ring in accordance with the first exemplary embodiment.

Next, first mounting ring 340 is detailed. FIG. 4 is a perspective view of wireless device case 200 and first mounting ring 340. FIG. 5 is a perspective view of first mounting ring 340.

First mounting ring 340 is made of resin. First mounting ring 340 includes bolt fastening portion 341 with slit 342. First mounting ring 340 deforms elastically such that its inner diameter broadens when a force is applied outward from inside.

Wireless device case 200 includes fastening screw boss 231 and two positioning pins 232 on a rear face of upper case 201. First mounting ring 340 has fastening screw hole 343 that fits to fastening screw boss 231. An attachment position of wireless device case 200 and first mounting ring 340 is determined by fitting two positioning pins 232 into two positioning holes 344 provided on first mounting ring 340.

In this state, wireless device case 200 and first mounting ring 340 are fixed by fastening screw 347. Fastening screw 347 is tightened using a bar-like tool such as a screwdriver. In this case, a bar-like tool such as a screwdriver can be inserted when slit 342 of first mounting ring 340 is broadened outward from inside, so as to tighten fastening screw 347.

Figure 6:
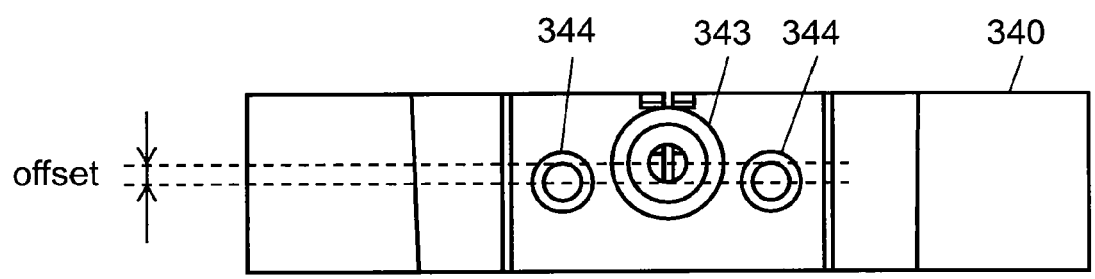
FIG. 6 is a side view of the first mounting ring in accordance with the first exemplary embodiment.

As shown in a side view in FIG. 6, centers of fastening screw hole 343 and positioning holes 344 are placed at different position, and disposed at offset position. This prevents first mounting ring 340 from being disposed upside down.

Figure 7:
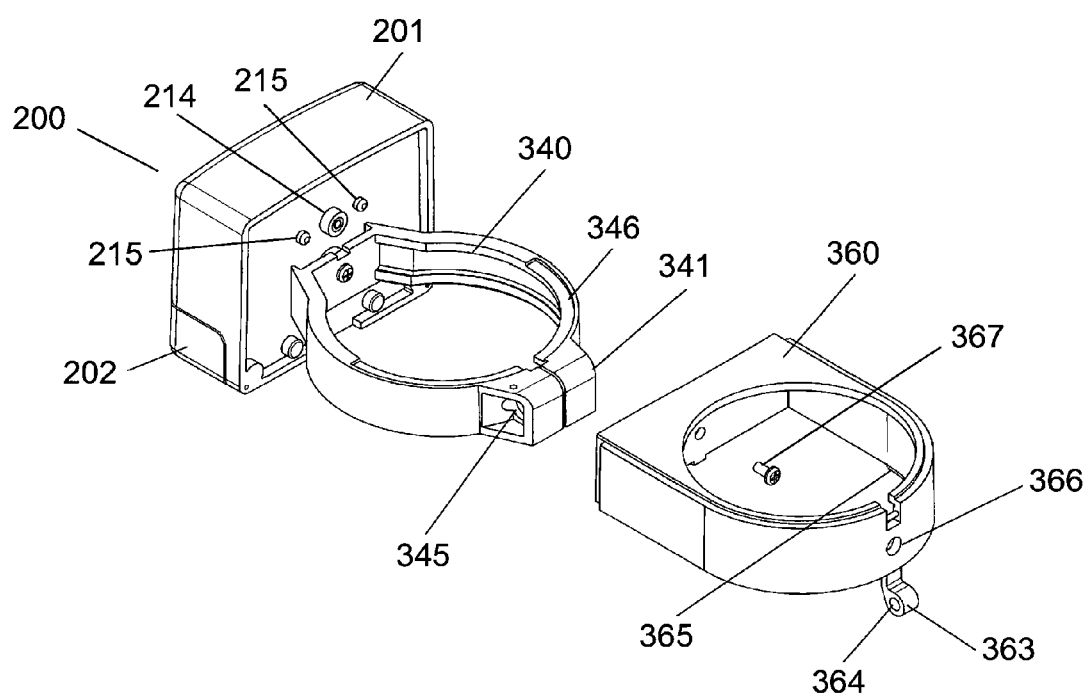
FIG. 7 is a perspective view of the wireless device case, the first mounting ring, and a second mounting ring in accordance with the first exemplary embodiment.
Figure 8:
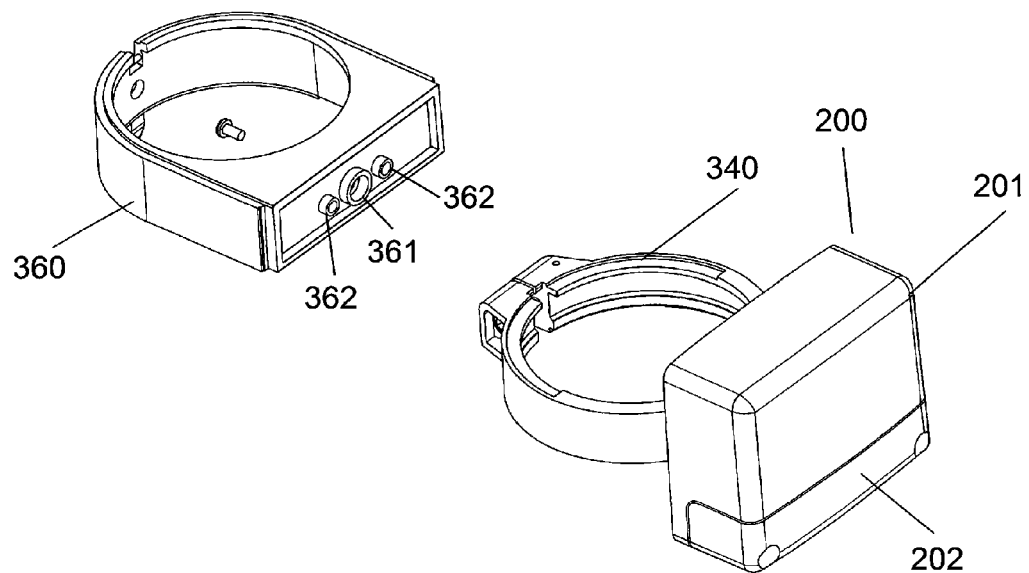
FIG. 8 is a perspective view of the wireless device case, the first mounting ring, and the second mounting ring seen from another direction in accordance with the first exemplary embodiment.

Next, second mounting ring 360 is detailed. FIG. 7 is a perspective view of wireless device case 200, and first mounting ring 340 and second mounting ring 360. FIG. 8 is a perspective view of wireless device case 200 and first mounting ring 340 and second mounting ring 360 seen from opposite side of FIG. 7. Second mounting ring 360 is also made of resin, same as first mounting ring 340.

Wireless device case 200 includes fastening screw boss 214 and two positioning pins 215 on the rear face of upper case 201. Fastening screw hole 361 is provided on second mounting ring 360 such that it fits to fastening screw boss 214. An attachment position of wireless device case 200 and second mounting ring 360 is determined by fitting two positioning pins 215 into two positioning holes 362.

In this state, wireless device case 200 and second mounting ring 360 are fixed by fastening screw 367. Fastening screw 367 is tightened using a bar-like tool such as a screwdriver. In this case, a bar-like tool such as a screwdriver is inserted through tool hole 366 provided on a side face of second mounting ring 360, so as to tighten fastening screw 367.

Next, connection of first mounting ring 340 and second mounting ring 360 is described. Co-fastening portion 363 of second mounting ring 360 can be fitted when broadening slit 342 of bolt fastening portion 341 of first mounting ring 340 is broadened. This arranges bolt hole 345 of bolt fastening portion 341 and bolt hole 364 of co-fastening portion 363 on the same axis. Accordingly, first mounting ring 340 and second mounting ring 360 are connected by passing one mounting bolt 301 (FIG. 2) through coaxial bolt holes 345 and 364. In FIG. 2, mounting bolt 301 and mounting nut 302 are used for tightening. If internal thread is formed inside bolt hole 345, it can be tightened instead of using mounting nut 302.

By tightening mounting bolt 301, first mounting ring 340 and second mounting ring 360 (i.e., device for mounting wireless device case 300) are tightened and fixed onto measurement display section 104, which is cylindrical section of water-meter body 120. In other words, wireless device case 200 can be easily and indirectly mounted to water-meter body 120.

Ring groove 346 is provided on the top face of first mounting ring 340. Ring protrusion 365 is provided on the bottom face of second mounting ring 360. Centers of first mounting ring 340 and second mounting ring 360 are matched by fitting ring groove 346 and ring protrusion 365.

Figure 9:
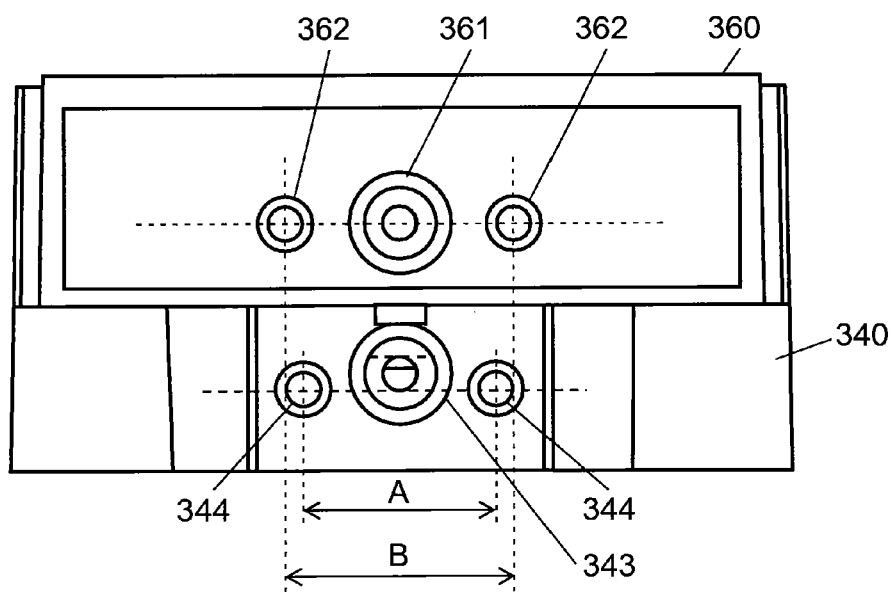
FIG. 9 is a side view of the first and second mounting rings in accordance with the first exemplary embodiment.

As shown in a side view in FIG. 9, distance A between two positioning holes 344 of first mounting ring 340 and distance B between two positioning holes 362 of second mounting ring 360 are different. In FIG. 9, distance A of two positioning holes 344 of first mounting ring 340 is shorter. This prevents that first mounting ring 340 and second mounting ring 360 are attached at erroneous positions on wireless device case 200.

Figure 10:
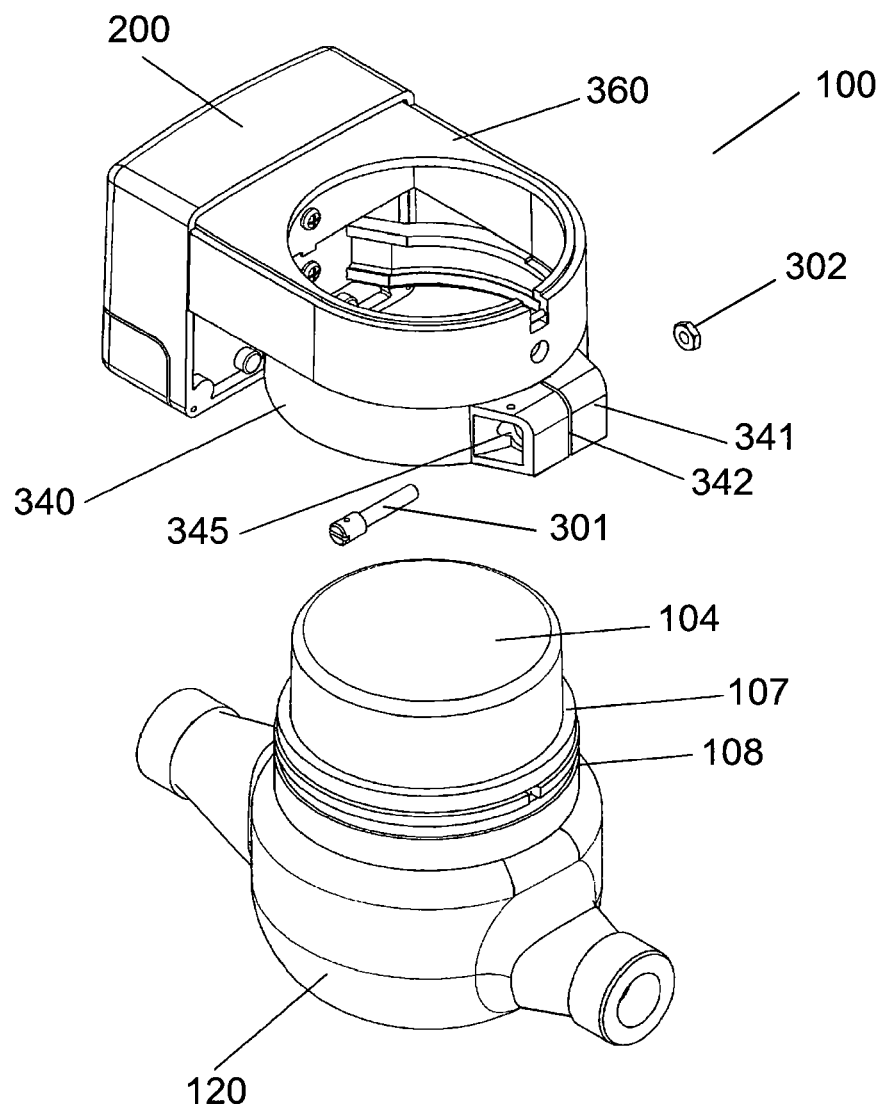
FIG. 10 is an exploded perspective view of the water meter in accordance with the first exemplary embodiment.

FIG. 10 is an exploded perspective view of water meter 100 illustrating a configuration of fixing wireless device case 200 onto water-meter body 120 using first mounting ring 340 and second mounting ring 360 (i.e., device for mounting wireless device case 300). Flanges 107 and 108 are provided at a bottom part of measurement display section 104 that is a cylindrical section of water-meter body 120. First mounting ring 340 is fitted from above such that slit 342 is broadened from inside to sandwich flanges 107 and 108. Fixing grooves (not illustrated) that fit to flanges 107 and 108 are formed on an inner side of first mounting ring 340. Then, wireless device case 200 is mounted to water-meter body 120, using mounting bolt 301, as already described.

Figure 11:
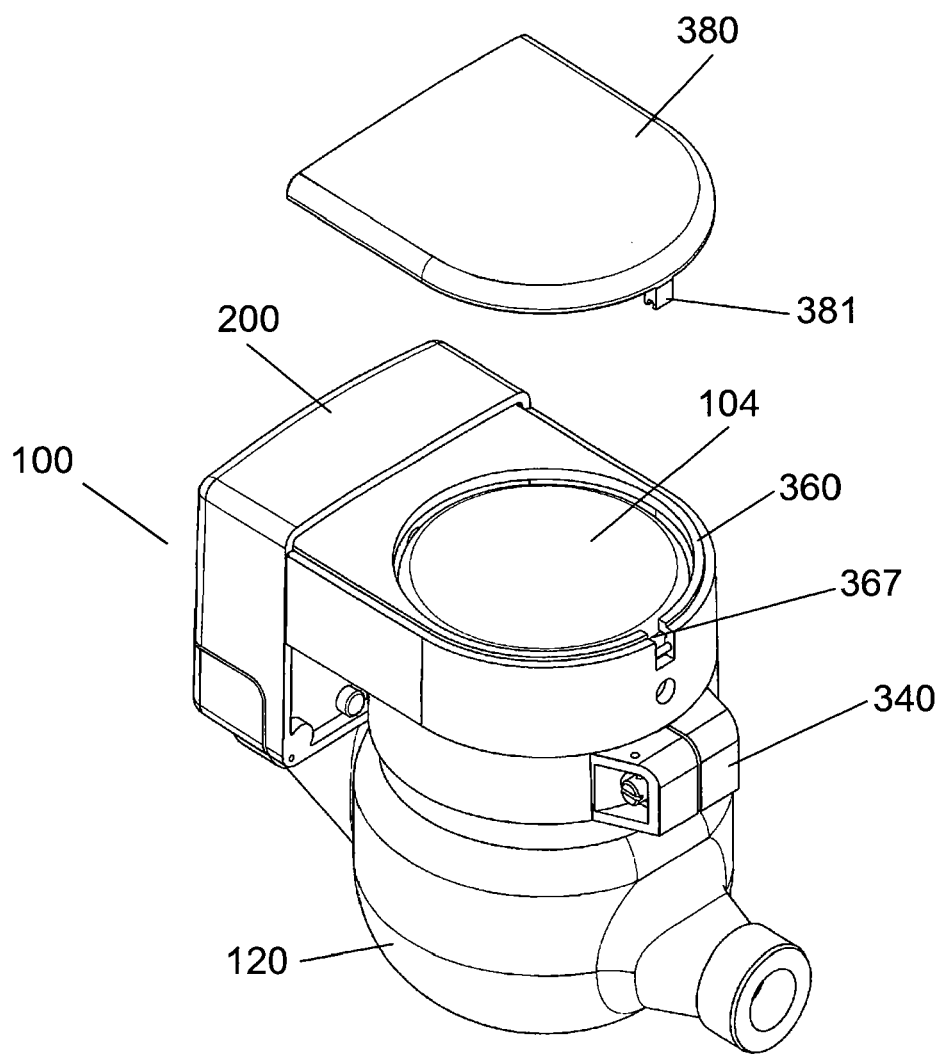
FIG. 11 is a perspective view of the water meter in accordance with the first exemplary embodiment.

Next, display cover 380 is described. FIG. 11 is a perspective view of water meter 100 illustrating an attachment configuration of display cover 380. Display cover 380 is made of resin. Display cover 380 includes bearing 381 on its bottom end face. Bearing 381 is fitted to shaft 367 of second mounting ring 360. This makes display cover 380 openable relative to measurement display section 104.

Figure 12:
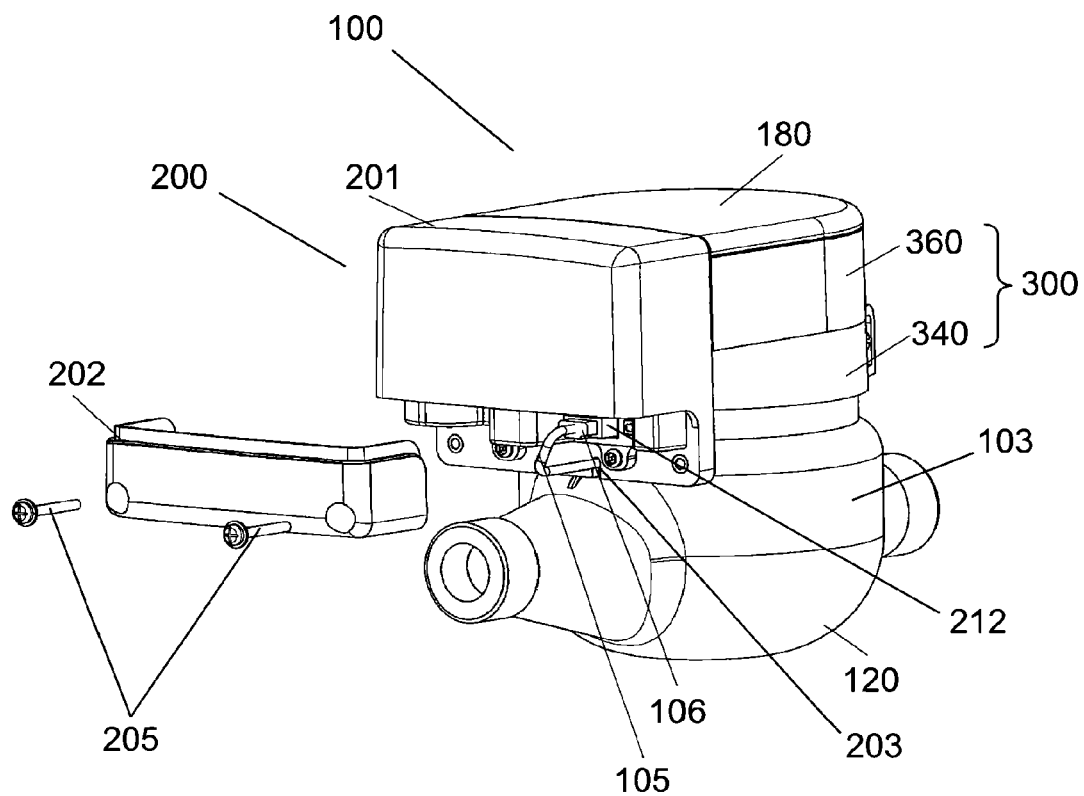
FIG. 12 is another exploded perspective view of the water meter in accordance with the first exemplary embodiment.

Next, electrical wiring of measurement section 103 and wireless device 210 is described. FIG. 12 is an exploded perspective view of water meter 100 illustrating the state of electrical wiring.

Lower case 202 is detached from upper case 201 by loosening two case screws 205 in a state that wireless device case 200 is mounted to water-meter body 120 using device for mounting wireless device case 300. In this state, connector receiver 212 of wireless device 210 is exposed. Here, connector 106 of data transmission line 105 extending from measurement section 103 of water-meter body 120 is connected to connector receiver 212. This makes a meter reading of water volume measured by measurement section 103 converted to an electrical signal in measurement display section 104. This electrical signal is sent to wireless device 210 via data transmission line 105. Wireless device 210 then transmits by wireless the meter reading in response to a call request from data collecting terminal 702.

Data transmission line 105 is connected to wireless device 210 through notch 203 on upper case 201. Notch 203 is positioned below connector receiver 212. This prevents moisture from being retained on connector receiver 212 or electronic substrate 216 even if moisture from water-meter body 120 follows along the surface of data transmission line 105 and enters inside wireless device case 200.

Accordingly, wireless device 210 is not affected by moisture because disposing wireless device 210 is independent of water-meter body 120. In addition, this configuration avoids moisture from reaching wireless device 210 even if moisture enters inside wireless device case 200. This prevents erroneous operation of electronic circuit, degradation of wireless performance, and degradation of insulating performance.

Figure 13:
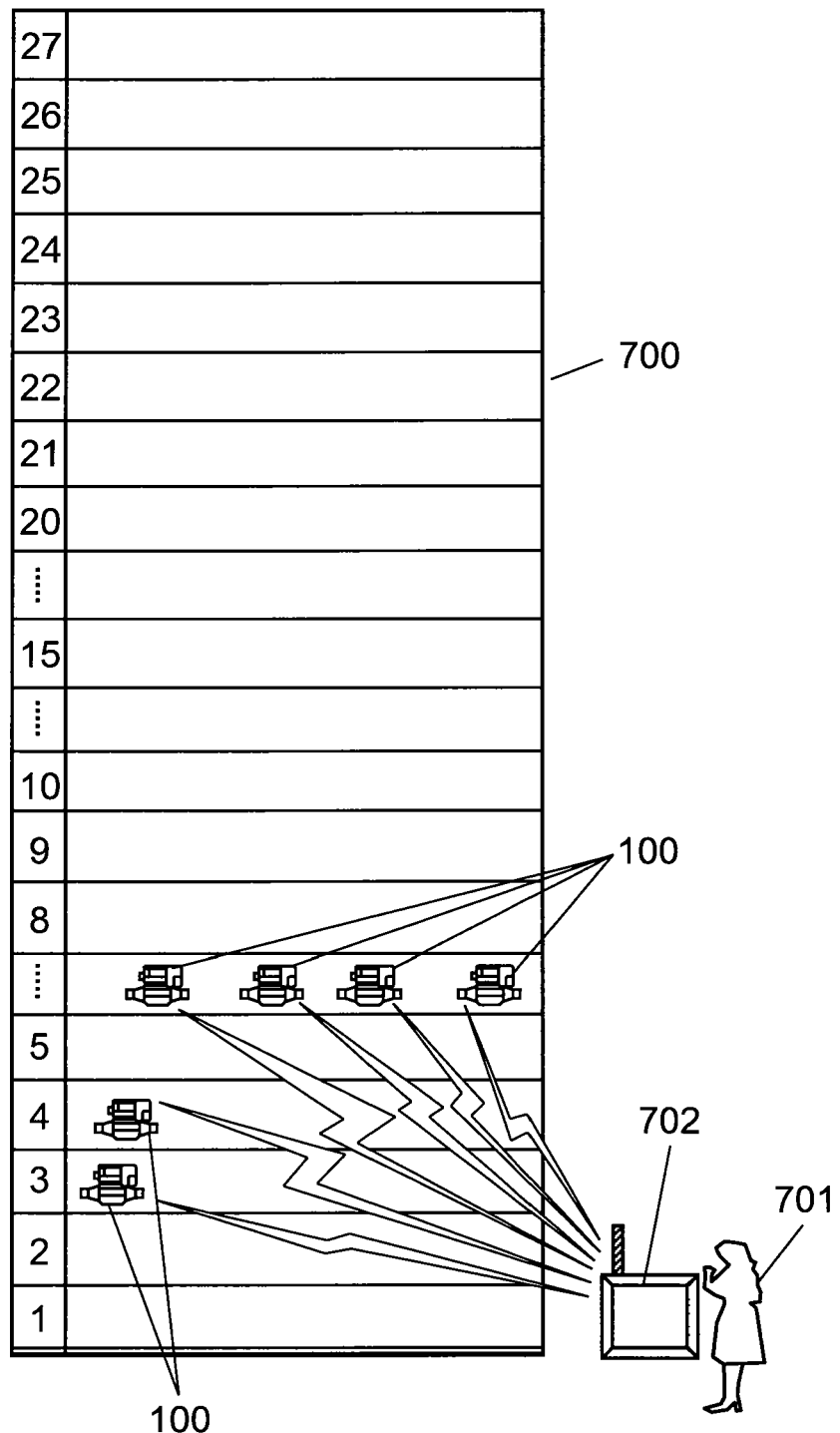
FIG. 13 is a chart illustrating how meter readings are collected in accordance with the first exemplary embodiment.
Figure 14:
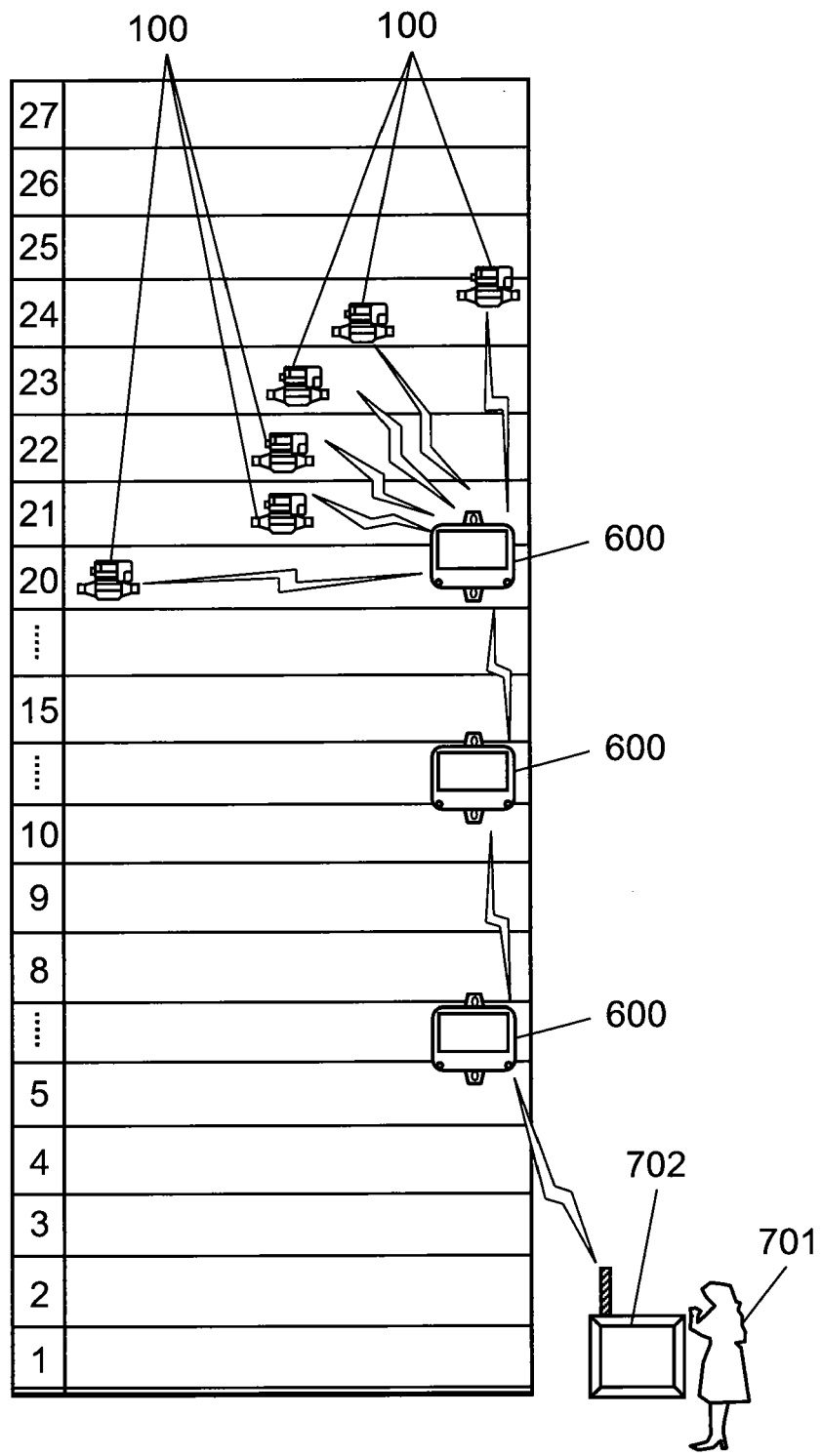
FIG. 14 is another chart illustrating how meter readings are collected in accordance with the first exemplary embodiment.

Next is described how to collect meter readings by water meter 100 using device for mounting wireless device case 300 in this exemplary embodiment. FIGS. 13 and 14 illustrate the state of collecting meter readings.

Water meter 100 is installed in each house in high-rise apartment building 700. Not all but some of residential water meters 100 are illustrated in FIGS. 13 and 14. Each water meter 100 has wireless device case 200 mounted using device for mounting wireless device case 300 in this exemplary embodiment. Wireless device case 200 has built-in wireless device 210.

Water-meter reader 701 who collects meter readings, which show volume of water used in each house, gives a command for transmitting meter readings to wireless devices 210 by making a call request from data collecting terminal 702. Each wireless device 210 receiving the call request transmits a meter reading by wireless to data collecting terminal 702. In this way, water-meter reader 701 collects a meter reading of water meter 100 in each house. In other words, water-meter reader 701 does not need to go to water meter 100 in each house to check a meter reading on measurement display section 104. This meter-reading system using wireless communications is called a batch wireless meter reading system.

On the other hand, as shown in FIG. 14, upper elevations of high-rise apartment building 700 over 20 stories are at height over tens of meters above the ground. This means that a distance between wireless device 210 of water meter 100 and data collecting terminal 702 becomes long. In this case, radio waves do not reach wireless device 210 and data collecting terminal 702 that water-meter reader 701 carry on the ground because intensity of radio waves reduces.

In this case, wireless repeater 600 is installed to relay radio waves between wireless device 210 and data collecting terminal 702. Wireless repeater 600 is provided at a middle elevation between the ground and upper elevations. As shown in FIG. 14, multiple wireless repeaters 600 can be provided, as required, to establish wireless repeater a few times. This enables water-meter reader 701 on the ground to collect meter readings even from houses in upper elevations at distant from the ground where radio waves are difficult to reach, because wireless repeater 600 relays radio waves.

Here, wireless repeater 600 transmits and receives by wireless a data signal, such as a meter reading. Accordingly, wireless device 210 of water meter 100 can also be used for this purpose. Since wireless device 210 is built in wireless device case 200 with a waterproof structure, wireless device case 200 and wireless device 210 can be used as wireless repeater 600. Wireless repeater 600 (i.e., wireless device case 200 with built-in wireless device 210) can thus be installed on an outer wall of building in addition to indoor places.

Figure 15:
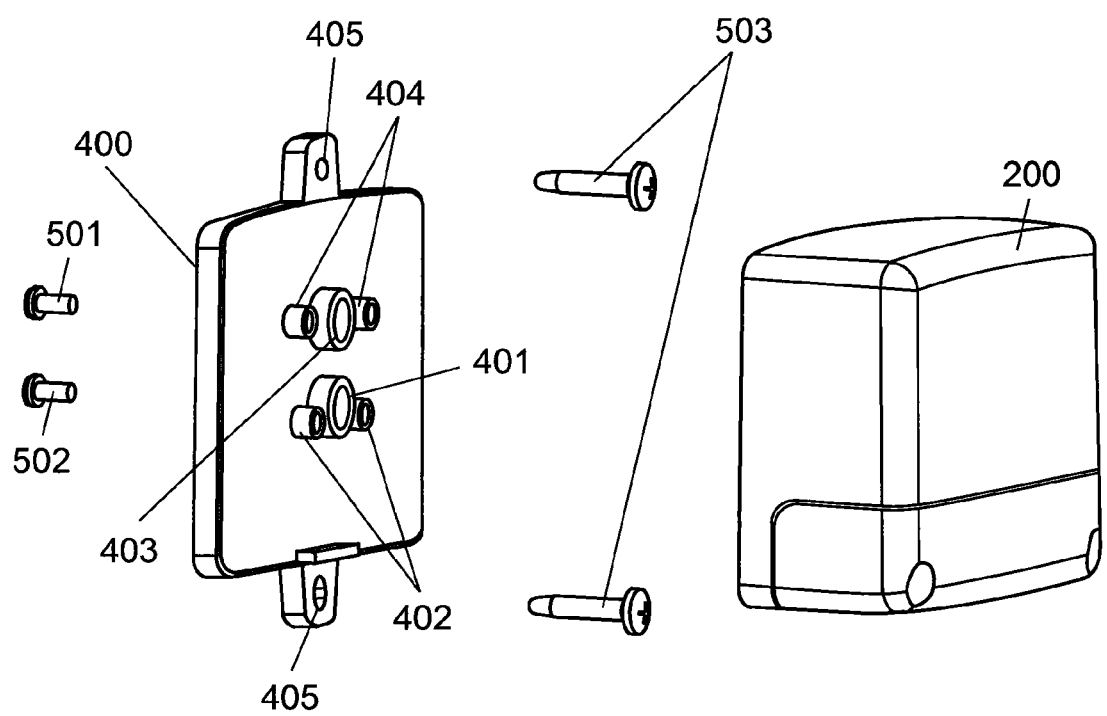
FIG. 15 is a perspective view of a configuration of mounting the wireless device case to a wall in accordance with the first exemplary embodiment.
Figure 16:
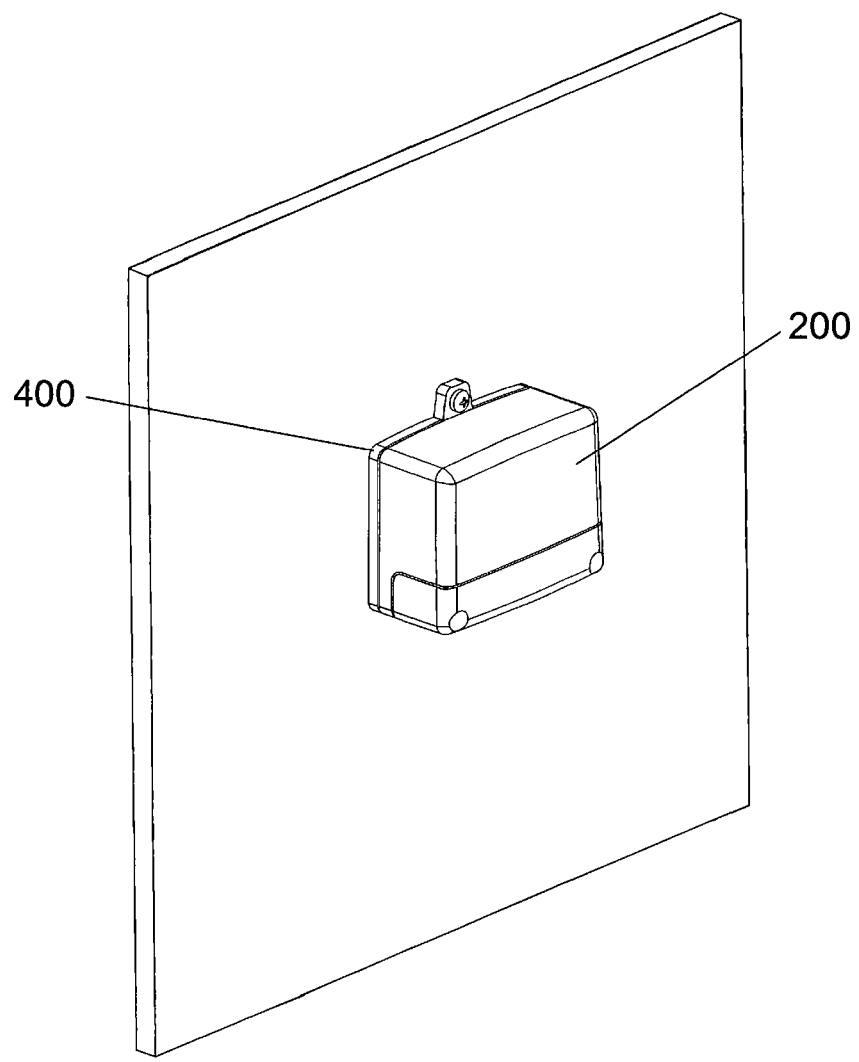
FIG. 16 is a perspective view illustrating the state that the wireless device case is mounted to the wall in accordance with the first exemplary embodiment of the present invention.

Next is described the case of mounting wireless device case 200 to a wall. FIG. 15 is a perspective view illustrating a configuration of mounting wireless device case 200 to a wall. FIG. 16 is a perspective view illustrating the state that wireless device case 200 is mounted to a wall.

Wireless device case 200 is mounted to a wall via wall mounting plate 400. Fastening screw holes 401 and 403, and two positioning holes 402 and 404 are provided on a front face of wall mounting plate 400. Fastening screw hole 401 has a shape same as fastening screw hole 343 of first mounting ring 340. A shape and distance between two positioning holes 402 are the same as the shape and distance of two positioning holes 344 of first mounting ring 340. In the same way, the shape of fastening screw hole 403 is the same as that of fastening screw hole 361 of second mounting ring 360. A shape and distance of two positioning holes 402 are the same as the shape and distance of two positioning holes 362 of second mounting ring 360. Mutual positional relationship between fastening screw holes 401 and 403 and two positioning holes 402 and 404, respectively, is the same as the mutual positional relationship of fastening screw holes 343 and 361 and two positioning holes 344 and 362, respectively, in the case of mounting wireless device case 200 to device for mounting wireless device case 300.

Accordingly, wireless device case 200 can be fitted to wall mounting plate 400 and fixed by screws 502 and 501. More specifically, fastening screw boss 231 of wireless device case 200 is fitted to fastening screw hole 401 of wall mounting plate 400, and they are fixed by screw 502. In addition, two positioning pins 232 of wireless device case 200 are fitted to two positioning holes 402 of wall mounting plate 400. Fastening screw boss 214 of wireless device case 200 is fitted to fastening screw hole 403 of wall mounting plate 400, and they are fixed by screw 501. In addition, two positioning pins 215 of wireless device case 200 are fitted to two positioning holes 404 of wall mounting plate 400.

Wall mounting plate 400 further includes wall mounting hole 405, and is fixed to the wall by screw 503. In this way, wireless device case 200 is mounted to the wall. In other words, mounting of wireless device case 200 to the wall enables the use of wireless device case 200 as wireless repeater 600. This allows reduction of manufacturing costs of wireless device 210, wireless repeater 600, and wireless device case 200.

INDUSTRIAL APPLICABILITY

The device for mounting wireless device case of the present invention disposes the wireless device independent of the meter, and the wireless device can be easily mounted to the meter. Accordingly, the present invention is applicable to measuring instruments that require wireless transmissions.

The invention claimed is:

1. A device for mounting a wireless device case, the device comprising:
   a first mounting ring and a second mounting ring fitted to a cylindrical section of a meter from above;
   wherein
   each of the first mounting ring and the second mounting ring has a fastening screw hole;
   each of the first mounting ring and the second mounting ring has a mounting bolt hole;
   the wireless device case is fixed by using fastening screws extending through the fastening screw holes of the first mounting ring and the second mounting ring; and
   the wireless device case is fixed to the meter by passing a co-mounting bolt through the mounting bolt holes of the first mounting ring and the second mounting ring, and tightening the first mounting ring and the second mounting ring together, wherein the mounting bolt hole of the first mounting ring is aligned with the mounting bolt hole of the second mounting ring along a mutual axis in an assembled state.

2. A device for mounting a wireless device case, the device comprising:
   a first mounting ring and a second mounting ring fitted to a cylindrical section of a meter from above;
   wherein
   each of the first mounting ring and the second mounting ring has a fastening screw hole;
   each of the first mounting ring and the second mounting ring has a mounting bolt hole;
   the wireless device case is fixed by using fastening screws extending through the fastening screw holes of the first mounting ring and the second mounting ring; and
   the wireless device case is fixed to the meter by passing a co-mounting bolt through the mounting bolt holes of the first mounting ring and the second mounting ring, and tightening the first mounting ring and the second mounting ring together,
   wherein the first mounting ring and the second mounting ring have different shapes relative to each other.

3. A device for mounting a wireless device case, the device comprising:
   a first mounting ring and a second mounting ring fitted to a cylindrical section of a meter from above;
   wherein
   each of the first mounting ring and the second mounting ring has a fastening screw hole;
   each of the first mounting ring and the second mounting ring has a mounting bolt hole;
   the wireless device case is fixed by using fastening screws extending through the fastening screw holes of the first mounting ring and the second mounting ring; and
   the wireless device case is fixed to the meter by passing a co-mounting bolt through the mounting bolt holes of the first mounting ring and the second mounting ring, and tightening the first mounting ring and the second mounting ring together,
   wherein the wireless device case is positioned outside of the first and second mounting rings.

* * * * *